(12) United States Patent
Faulkner et al.

(10) Patent No.: US 8,719,319 B2
(45) Date of Patent: May 6, 2014

(54) METHOD AND APPARATUS FOR COLLECTING AND DISPLAYING NETWORK DEVICE INFORMATION

(75) Inventors: Gary Faulkner, Austin, TX (US); Joshua Thomas Martinek, Austin, TX (US)

(73) Assignee: Schneider Electric IT Corporation, West Kingston, RI (US)

( * ) Notice: Subject to any disclaimer, the term of this patent is extended or adjusted under 35 U.S.C. 154(b) by 0 days.

(21) Appl. No.: 12/857,214

(22) Filed: Aug. 16, 2010

(65) Prior Publication Data

US 2011/0040781 A1 Feb. 17, 2011

Related U.S. Application Data

(63) Continuation of application No. 10/428,874, filed on May 2, 2003, now Pat. No. 7,779,026.

(60) Provisional application No. 60/377,708, filed on May 3, 2002.

(51) Int. Cl.
*G06F 7/00* (2006.01)
*G06F 17/30* (2006.01)

(52) U.S. Cl.
USPC .......................................... 707/827

(58) Field of Classification Search
USPC .......................... 707/769, 721, 827
See application file for complete search history.

(56) References Cited

U.S. PATENT DOCUMENTS

| | | |
|---|---|---|
| 3,810,138 A | 5/1974 | Thompson et al. |
| 4,349,879 A | 9/1982 | Peddie et al. |
| 4,521,645 A | 6/1985 | Carroll |
| 4,568,934 A | 2/1986 | Allgood |
| 4,636,652 A | 1/1987 | Raes |
| 4,637,020 A | 1/1987 | Schinabeck |
| 4,650,347 A | 3/1987 | Shigemura et al. |
| 4,668,939 A | 5/1987 | Kimura et al. |
| 4,718,025 A | 1/1988 | Minor et al. |

(Continued)

FOREIGN PATENT DOCUMENTS

| | | |
|---|---|---|
| AU | 3855395 A1 | 6/1996 |
| AU | 5601198 A1 | 7/1998 |

(Continued)

OTHER PUBLICATIONS

Axis Communications, "Axis 200+ and 240 Camera Server: User's Guide", www.axis.com/techsup/cam_servers/cam_240/index.htm, pp. 1-38, Jan. 1999.

(Continued)

*Primary Examiner* — Usmaan Saeed
*Assistant Examiner* — Paul Kim
(74) *Attorney, Agent, or Firm* — Lando & Anastasi, LLP

(57) ABSTRACT

In one particular embodiment, the disclosure is directed to a network management system. The network monitoring system includes at least one device definition file, a simple network management protocol enabled communications interface, and a data access interface. The definition file includes query instructions associated with portions of MIBs associated with a network device. The simple network management protocol enabled communications interface may access the network device using the query instructions and may receive response data from the network device. The data access interface may be configured to provide external access to the response data and configure thresholds.

20 Claims, 7 Drawing Sheets

(56) References Cited

U.S. PATENT DOCUMENTS

| | | | |
|---|---|---|---|
| 4,747,041 | A | 5/1988 | Engel et al. |
| 4,751,648 | A | 6/1988 | Sears, III et al. |
| 4,816,208 | A | 3/1989 | Woods et al. |
| 4,823,290 | A | 4/1989 | Fasack et al. |
| 4,964,065 | A | 10/1990 | Hicks et al. |
| 5,043,807 | A | 8/1991 | Rabii |
| 5,061,916 | A | 10/1991 | French et al. |
| 5,086,385 | A | 2/1992 | Launey et al. |
| 5,097,328 | A | 3/1992 | Boyette |
| 5,109,278 | A | 4/1992 | Erickson et al. |
| 5,153,837 | A | 10/1992 | Shaffer et al. |
| 5,157,732 | A | 10/1992 | Ishii et al. |
| 5,189,394 | A | 2/1993 | Walter et al. |
| 5,216,623 | A | 6/1993 | Barrett et al. |
| 5,220,522 | A | 6/1993 | Wilson et al. |
| 5,225,997 | A | 7/1993 | Lederer et al. |
| 5,229,850 | A | 7/1993 | Toyoshima |
| 5,262,758 | A | 11/1993 | Nam et al. |
| 5,289,275 | A | 2/1994 | Ishii et al. |
| 5,317,742 | A | 5/1994 | Bapat |
| 5,367,670 | A | 11/1994 | Ward et al. |
| 5,382,943 | A | 1/1995 | Tanaka |
| 5,395,042 | A | 3/1995 | Riley et al. |
| 5,400,246 | A | 3/1995 | Wilson et al. |
| 5,404,136 | A | 4/1995 | Marsden |
| 5,475,364 | A | 12/1995 | Kenet |
| 5,488,430 | A | 1/1996 | Hong |
| 5,491,511 | A | 2/1996 | Odle |
| 5,508,941 | A | 4/1996 | Leplingard et al. |
| 5,528,507 | A | 6/1996 | McNamara et al. |
| 5,548,659 | A | 8/1996 | Okamoto |
| 5,553,609 | A | 9/1996 | Chen et al. |
| 5,561,476 | A | 10/1996 | Kershaw et al. |
| 5,566,339 | A | 10/1996 | Perholtz et al. |
| 5,572,195 | A | 11/1996 | Heller et al. |
| 5,581,478 | A * | 12/1996 | Cruse et al. ............. 700/276 |
| 5,586,202 | A | 12/1996 | Ohki et al. |
| 5,588,067 | A | 12/1996 | Peterson et al. |
| 5,589,764 | A | 12/1996 | Lee |
| 5,602,585 | A | 2/1997 | Dickinson et al. |
| 5,621,662 | A | 4/1997 | Humphries et al. |
| 5,634,002 | A | 5/1997 | Polk et al. |
| 5,659,470 | A | 8/1997 | Goska et al. |
| 5,664,202 | A | 9/1997 | Chen et al. |
| 5,715,160 | A | 2/1998 | Plotke |
| 5,731,832 | A | 3/1998 | Ng |
| 5,732,074 | A | 3/1998 | Spaur et al. |
| 5,737,518 | A | 4/1998 | Grover et al. |
| 5,742,762 | A | 4/1998 | Scholl et al. |
| RE35,793 | E | 5/1998 | Halpern |
| 5,768,430 | A | 6/1998 | Takashima et al. |
| 5,798,798 | A | 8/1998 | Rector et al. |
| 5,805,458 | A | 9/1998 | McNamara et al. |
| 5,812,055 | A | 9/1998 | Candy et al. |
| 5,818,725 | A | 10/1998 | McNamara et al. |
| 5,822,302 | A | 10/1998 | Landry, Jr. et al. |
| 5,829,130 | A | 11/1998 | Miller |
| 5,870,698 | A | 2/1999 | Riedel et al. |
| 5,892,440 | A | 4/1999 | Bryan |
| 5,905,867 | A | 5/1999 | Giorgio et al. |
| 5,913,037 | A | 6/1999 | Spofford et al. |
| 5,926,210 | A | 7/1999 | Hackett et al. |
| 5,937,092 | A | 8/1999 | Wootton et al. |
| 5,937,097 | A | 8/1999 | Lennon |
| 5,949,974 | A | 9/1999 | Ewing et al. |
| 5,955,946 | A | 9/1999 | Beheshti et al. |
| 5,963,457 | A | 10/1999 | Kanoi et al. |
| 5,963,958 | A | 10/1999 | Cottrill |
| 5,968,116 | A | 10/1999 | Day, II et al. |
| 5,974,237 | A | 10/1999 | Shurmer et al. |
| 5,978,594 | A | 11/1999 | Bonnell et al. |
| 5,978,912 | A | 11/1999 | Rakavy et al. |
| 5,987,614 | A | 11/1999 | Mitchell et al. |
| 5,991,885 | A | 11/1999 | Chang et al. |
| 5,999,179 | A | 12/1999 | Kekic et al. |
| 6,001,065 | A | 12/1999 | DeVito |
| 6,052,750 | A | 4/2000 | Lea |
| 6,055,480 | A | 4/2000 | Nevo et al. |
| 6,057,834 | A | 5/2000 | Pickover |
| 6,058,434 | A | 5/2000 | Wilt et al. |
| 6,078,253 | A | 6/2000 | Fowler |
| 6,081,606 | A | 6/2000 | Hansen et al. |
| 6,085,243 | A | 7/2000 | Fletcher et al. |
| 6,088,816 | A | 7/2000 | Nouri et al. |
| 6,094,676 | A | 7/2000 | Gray et al. |
| 6,100,806 | A | 8/2000 | Gaukel |
| 6,104,755 | A | 8/2000 | Ohara |
| 6,104,868 | A | 8/2000 | Peters et al. |
| 6,105,061 | A | 8/2000 | Nakai |
| 6,108,782 | A | 8/2000 | Fletcher et al. |
| 6,112,235 | A | 8/2000 | Spofford |
| 6,115,468 | A | 9/2000 | De Nicolo |
| 6,122,603 | A | 9/2000 | Budike, Jr. |
| 6,122,639 | A * | 9/2000 | Babu et al. ............. 1/1 |
| 6,125,145 | A | 9/2000 | Koyanagi et al. |
| 6,128,016 | A | 10/2000 | Coelho et al. |
| 6,138,078 | A | 10/2000 | Canada et al. |
| 6,138,249 | A | 10/2000 | Nolet |
| 6,139,177 | A | 10/2000 | Venkatraman et al. |
| 6,144,770 | A | 11/2000 | Lennon |
| 6,148,262 | A | 11/2000 | Fry |
| 6,157,943 | A | 12/2000 | Meyer |
| 6,160,584 | A | 12/2000 | Yanagita |
| 6,160,926 | A | 12/2000 | Dow et al. |
| 6,167,406 | A | 12/2000 | Hoskins et al. |
| 6,170,007 | B1 | 1/2001 | Venkatraman et al. |
| 6,173,323 | B1 | 1/2001 | Moghe |
| 6,175,866 | B1 | 1/2001 | Holloway et al. |
| 6,175,927 | B1 | 1/2001 | Cromer et al. |
| 6,177,884 | B1 | 1/2001 | Hunt et al. |
| 6,182,094 | B1 | 1/2001 | Humpleman et al. |
| 6,182,157 | B1 | 1/2001 | Schlener et al. |
| 6,189,109 | B1 | 2/2001 | Sheikh et al. |
| 6,195,018 | B1 | 2/2001 | Ragle et al. |
| 6,208,261 | B1 | 3/2001 | Olstead |
| 6,208,345 | B1 | 3/2001 | Sheard et al. |
| 6,215,404 | B1 | 4/2001 | Morales |
| 6,216,956 | B1 | 4/2001 | Ehlers et al. |
| 6,219,628 | B1 | 4/2001 | Kodosky et al. |
| 6,229,429 | B1 | 5/2001 | Horon |
| 6,236,332 | B1 | 5/2001 | Conkright et al. |
| 6,246,780 | B1 | 6/2001 | Sato |
| 6,259,956 | B1 | 7/2001 | Myers et al. |
| 6,266,721 | B1 | 7/2001 | Sheikh et al. |
| 6,271,845 | B1 | 8/2001 | Richardson |
| 6,272,537 | B1 * | 8/2001 | Kekic et al. ............. 709/223 |
| 6,281,790 | B1 | 8/2001 | Kimmel et al. |
| 6,282,546 | B1 | 8/2001 | Gliechauf et al. |
| 6,298,144 | B1 | 10/2001 | Pucker, II et al. |
| 6,304,900 | B1 | 10/2001 | Cromer et al. |
| 6,311,105 | B1 | 10/2001 | Budike, Jr. |
| 6,311,214 | B1 | 10/2001 | Rhoads |
| 6,324,644 | B1 | 11/2001 | Rakavy et al. |
| 6,329,792 | B1 | 12/2001 | Dunn et al. |
| 6,332,202 | B1 | 12/2001 | Sheikh et al. |
| 6,338,094 | B1 | 1/2002 | Scott et al. |
| 6,343,320 | B1 | 1/2002 | Fairchild et al. |
| 6,360,255 | B1 | 3/2002 | McCormack et al. |
| 6,363,421 | B2 | 3/2002 | Barker et al. |
| 6,363,422 | B1 | 3/2002 | Hunter et al. |
| 6,373,840 | B1 | 4/2002 | Chen |
| 6,374,296 | B1 | 4/2002 | Lim et al. |
| 6,375,614 | B1 | 4/2002 | Braun et al. |
| 6,381,700 | B1 | 4/2002 | Yoshida |
| 6,389,464 | B1 | 5/2002 | Krishnamurthy et al. |
| 6,396,534 | B1 | 5/2002 | Mahler et al. |
| 6,400,103 | B1 | 6/2002 | Adamson |
| 6,400,996 | B1 | 6/2002 | Hoffberg et al. |
| 6,402,691 | B1 | 6/2002 | Peddicord et al. |
| 6,404,348 | B1 | 6/2002 | Wilfong |
| 6,405,216 | B1 | 6/2002 | Minnaert et al. |
| 6,449,745 | B1 | 9/2002 | Kim et al. |
| 6,477,667 | B1 | 11/2002 | Levi et al. |
| 6,496,105 | B2 | 12/2002 | Fisher et al. |

(56) References Cited

U.S. PATENT DOCUMENTS

| | | |
|---|---|---|
| 6,505,086 B1 | 1/2003 | Dodd, Jr. et al. |
| 6,505,256 B1 | 1/2003 | York |
| 6,510,350 B1 | 1/2003 | Steen, III et al. |
| 6,529,230 B1 | 3/2003 | Chong |
| 6,529,936 B1 | 3/2003 | Mayo et al. |
| 6,553,336 B1 | 4/2003 | Johnson et al. |
| 6,553,418 B1 | 4/2003 | Collins et al. |
| 6,591,279 B1 | 7/2003 | Emens et al. |
| 6,611,866 B1 | 8/2003 | Goldman |
| 6,615,201 B1 | 9/2003 | Seshadri et al. |
| 6,640,145 B2 | 10/2003 | Hoffberg et al. |
| 6,658,595 B1 | 12/2003 | Thamattoor |
| 6,681,787 B2 | 1/2004 | Tinsley et al. |
| 6,686,838 B1 | 2/2004 | Rezvani et al. |
| 6,714,977 B1 | 3/2004 | Fowler et al. |
| 6,718,364 B2 | 4/2004 | Connelly et al. |
| 6,756,998 B1 | 6/2004 | Bilger |
| 6,801,940 B1 | 10/2004 | Moran et al. |
| 6,829,630 B1 | 12/2004 | Pajak et al. |
| 6,862,589 B2 | 3/2005 | Grant |
| 6,901,440 B1 | 5/2005 | Bimm et al. |
| 6,985,901 B1 | 1/2006 | Sachse et al. |
| 6,990,513 B2 | 1/2006 | Belfiore et al. |
| 7,051,096 B1 | 5/2006 | Krawiec et al. |
| 7,062,553 B2 * | 6/2006 | Liang ............................ 709/224 |
| 7,068,597 B1 | 6/2006 | Fijolek et al. |
| 7,120,689 B2 | 10/2006 | Gonsalves et al. |
| 7,159,022 B2 | 1/2007 | Primm et al. |
| 7,207,041 B2 | 4/2007 | Elson et al. |
| 7,228,404 B1 | 6/2007 | Patel et al. |
| 7,240,364 B1 | 7/2007 | Branscomb et al. |
| 7,257,626 B2 | 8/2007 | Mokuya et al. |
| 7,266,595 B1 | 9/2007 | Black et al. |
| 7,433,944 B2 * | 10/2008 | Kanada et al. ................ 709/223 |
| 7,779,026 B2 | 8/2010 | Faulkner et al. |
| 7,958,170 B2 | 6/2011 | Faulkner et al. |
| 8,019,798 B2 | 9/2011 | Faulkner et al. |
| 2001/0005894 A1 | 6/2001 | Fukui |
| 2001/0047213 A1 | 11/2001 | Sepe, Jr. |
| 2001/0047410 A1 | 11/2001 | Defosse |
| 2001/0052006 A1 | 12/2001 | Barker et al. |
| 2001/0055965 A1 | 12/2001 | Delp et al. |
| 2002/0003575 A1 | 1/2002 | Marchese |
| 2002/0023258 A1 | 2/2002 | Elwahab et al. |
| 2002/0041603 A1 | 4/2002 | Kato |
| 2002/0043969 A1 | 4/2002 | Duncan et al. |
| 2002/0071031 A1 | 6/2002 | Lord et al. |
| 2002/0072868 A1 | 6/2002 | Bartone et al. |
| 2002/0083378 A1 | 6/2002 | Nickels |
| 2002/0124081 A1 | 9/2002 | Primm et al. |
| 2002/0143905 A1 * | 10/2002 | Govindarajan et al. ........ 709/220 |
| 2002/0152298 A1 | 10/2002 | Kikta et al. |
| 2002/0161885 A1 | 10/2002 | Childers et al. |
| 2002/0165961 A1 | 11/2002 | Everdell et al. |
| 2002/0174223 A1 | 11/2002 | Childers et al. |
| 2003/0028895 A1 | 2/2003 | Buehler et al. |
| 2003/0093433 A1 | 5/2003 | Seaman et al. |
| 2003/0098789 A1 | 5/2003 | Murakami et al. |
| 2003/0099254 A1 | 5/2003 | Richter |
| 2003/0120822 A1 | 6/2003 | Langrind et al. |
| 2003/0126195 A1 | 7/2003 | Reynolds et al. |
| 2003/0191765 A1 | 10/2003 | Bargh et al. |
| 2003/0204756 A1 | 10/2003 | Ransom et al. |
| 2006/0010232 A1 | 1/2006 | Page et al. |

FOREIGN PATENT DOCUMENTS

| | | |
|---|---|---|
| AU | 0016673 A5 | 6/2000 |
| CA | 2300053 | 2/1999 |
| CA | 2312075 | 6/1999 |
| CA | 2328939 | 9/1999 |
| CN | 87100353 A | 9/1988 |
| CN | 1294350 A | 5/2001 |
| EP | 0444997 B1 | 2/1991 |
| EP | 0591585 B1 | 4/1994 |
| EP | 0738065 A1 | 3/1996 |
| EP | 0744112 B1 | 11/1996 |
| EP | 0859489 A2 | 1/1998 |
| EP | 0978780 A1 | 8/1998 |
| EP | 0917034 | 10/1998 |
| EP | 0917034 B1 | 10/1998 |
| EP | 0963076 A3 | 5/1999 |
| EP | 0964551 A1 | 6/1999 |
| EP | 0927933 A2 | 7/1999 |
| EP | 0977112 A2 | 7/1999 |
| EP | 0956680 A1 | 11/1999 |
| EP | 1014622 A2 | 12/1999 |
| EP | 0990986 A | 4/2000 |
| EP | 0992100 | 4/2000 |
| EP | 1002268 | 5/2000 |
| EP | 1009130 A | 6/2000 |
| EP | 1032884 A1 | 9/2000 |
| EP | 1049291 A2 | 11/2000 |
| EP | 1115264 A2 | 12/2000 |
| EP | 1124301 A2 | 12/2000 |
| EP | 1096724 | 5/2001 |
| EP | 1142289 A1 | 10/2001 |
| EP | 1150188 A2 | 10/2001 |
| EP | 1178628 A2 | 2/2002 |
| GB | 9826895 A | 1/1999 |
| GB | 9913682 A | 8/1999 |
| GB | 2335124 A | 9/1999 |
| GB | 2343036 A | 4/2000 |
| GB | 2344718 A | 6/2000 |
| GB | 2351205 A | 12/2000 |
| GB | 2344718 B | 1/2001 |
| GB | 2355163 A | 4/2001 |
| GB | 2359369 A | 8/2001 |
| HU | 9300145 U0 | 8/1993 |
| JP | 3099398 A2 | 4/1991 |
| JP | 5040889 A2 | 2/1993 |
| JP | 6105376 A2 | 4/1994 |
| JP | 6119581 A2 | 4/1994 |
| JP | 8307541 | 11/1996 |
| JP | 11164035 A2 | 6/1999 |
| JP | 11219388 A2 | 8/1999 |
| JP | 11338666 | 12/1999 |
| JP | 2000092092 A2 | 3/2000 |
| JP | 2000134606 A2 | 5/2000 |
| JP | 2000151606 A2 | 5/2000 |
| JP | 2000209204 A2 | 7/2000 |
| JP | 2000278773 A2 | 10/2000 |
| TW | 0443058 B | 6/2001 |
| TW | 0448349 B | 8/2001 |
| WO | 9428635 A2 | 12/1994 |
| WO | 9521506 | 8/1995 |
| WO | 9615615 | 5/1996 |
| WO | 9730879 | 8/1997 |
| WO | 9801838 | 1/1998 |
| WO | 9804067 A1 | 1/1998 |
| WO | 9826541 | 6/1998 |
| WO | 9908183 | 2/1999 |
| WO | 9915950 | 4/1999 |
| WO | 9927456 | 6/1999 |
| WO | 9945445 | 9/1999 |
| WO | 0035177 | 6/2000 |
| WO | 0039724 | 7/2000 |
| WO | 0054557 | 9/2000 |
| WO | 0073866 A1 | 12/2000 |
| WO | 0079500 A1 | 12/2000 |
| WO | 0101366 | 1/2001 |
| WO | 0108396 | 2/2001 |
| WO | 0127763 A1 | 4/2001 |
| WO | 0157631 A1 | 8/2001 |
| WO | 0161665 A2 | 8/2001 |
| WO | 0169405 A1 | 9/2001 |
| WO | 0169504 | 9/2001 |
| WO | 0179935 A1 | 10/2001 |
| WO | 0157477 C1 | 11/2001 |
| WO | 0182028 A2 | 11/2001 |
| WO | 0193042 A2 | 12/2001 |
| WO | 0193508 A1 | 12/2001 |
| WO | 0197907 A2 | 12/2001 |

(56) References Cited

FOREIGN PATENT DOCUMENTS

| WO | 0199402 | A2 | 12/2001 |
|---|---|---|---|
| WO | 0201877 | A1 | 1/2002 |
| WO | 0211391 | A2 | 2/2002 |
| WO | 0169405 | C1 | 3/2002 |
| WO | 0233980 | A2 | 4/2002 |
| WO | 0237280 | A2 | 5/2002 |
| WO | 0079500 | C2 | 6/2002 |
| WO | 0247044 | | 6/2002 |
| WO | 0247369 | A1 | 6/2002 |
| WO | 0248830 | A2 | 6/2002 |
| WO | 0249285 | | 6/2002 |
| WO | 03094031 | | 11/2003 |

OTHER PUBLICATIONS

Axis Communications, "Network Camera Developments Enable Live Web Imaging", Axis 2100 white paper, www.axis.com/products/videos/camera/documentation.htm, pp. 1-12, Nov. 1999.

Axis Communications, "Axis 2400/2401 Administration Manual Version 1.1", www.axis.com/techsup/cam_servers/cam_2400/index.htm, version 1.1.xx, part No. 16741, pp. 1-78, Jul. 1999.

Fossum, "CMOS image sensors; electronic camera-on-a-chip", IEEE Transactions on Electron Devices, vol. 44, iss. 10, pp. 1689-1698, Oct. 1997.

Office Actions, dated Aug. 21, 2008, Apr. 20, 2009, Nov. 18, 2009 and Mar. 18, 2010 from pending U.S. Appl. No. 11/560,698.

Office Actions dated Jul. 28, 2006, Apr. 12, 2007, Sep. 24, 2007, Jul. 24, 2008, May 7, 2009 and Sep. 23, 2009 from U.S. Appl. No. 10/428,874.

Office Actions dated Aug. 8, 2008, Mar. 9, 2009, Sep. 9, 2009 and Mar. 22, 2010 from U.S. Appl. No. 11/560,684.

International Search Report dated Sep. 4, 2002 in PCT/US02/09178.

Duran, J.W. et al. "Virtual personal computers and the portable network," IEEE Proceedings of Inter. Performance, Computing, and Communications, IPCCC'99, p. 52-56, Feb. 1999.

International Search Report dated Aug. 22, 2002 in PCT/US02/09179.

Sinetica Corp., "Newsletter, Issue One 99", Sinetica, UK, www.sinetica.co.uk, Feb. 1999, XP002160504, 4 pp.

Sinetica Corp., "Netcom TH. Advanced SNMP Agent with Web Browser Support", Sinetica, UK, www.sinetica.co.uk, Apr. 2000, XP002160505, 2 pp.

Office Action dated Oct. 27, 2010 from pending U.S. Appl. No. 11/560,698.

\* cited by examiner

Server Details

Details for SNMP target 172.16.0.55

System/Status | Network Interfaces | Advanced Details

| Description | Value |
| --- | --- |
| Vendor | Dell Computer Corporation |
| Description | PowerEdge 2450/866 |
| Power supply 1 | ok |
| Power supply 2 | ok |
| Processor 1 core (volts) | 1.870 |
| Processor 2 core (volts) | 1.666 |
| Motherboard +5V (volts) | 4.891 |
| Motherboard +12V (volts) | 11.957 |
| Motherboard +3.3V (volts) | 3.272 |
| Motherboard +2.5V (volts) | 2.504 |
| Motherboard GTL Termination (volts) | 1.503 |
| Motherboard Battery (volts) | 2.948 |
| Backplane +5V (volts) | 4.940 |
| Backplane +12V (volts) | 11.812 |
| SCSI A external termination (volts) | 4.968 |
| Backplane +3.3V (volts) | 3.277 |

FIG. 6

Individual Server Settings

Settings for SNMP target #2

SNMP Target Settings

| | |
|---|---|
| Target Hostname/IP Address | 172.16.0.55 |
| SNMP Port | 163 |
| SNMP Read | ****** |
| SNMP Timeout (seconds) | 3.0 |
| SNMP Errors | 3 |
| Primary Email Address: | |
| Secondary Email Address: | |

[Test Alerts]

Alert Settings
- ☑ Alert on SNMP Agent Unavailable
- ☑ Alert on ICMP Ping Timeouts
- ☑ Alert on interface status
- ☑ Alert on interface input errors
- ☑ Alert on interface output errors

Advanced Configuration

| | Description | OID | Type | Comparison Type | Comparator | Comparison Value | Comparator |
|---|---|---|---|---|---|---|---|
| Edit Thresholds | Vendor | 1.3.4.1.4.1.674.10442.1.200... | String | No Comparison | >= | | <= |
| Edit Thresholds | Description | 1.3.4.1.4.1.674.10442.1.300... | String | No Comparison | >= | | <= |
| Edit Thresholds | Power supply 1 | 1.3.4.1.4.1.674.10442.1.600... | Integer | No Comparison | >= | | <= |
| Edit Thresholds | Power supply 2 | 1.3.4.1.4.1.674.10442.1.400... | Integer | No Comparison | >= | | <= |
| Edit Thresholds | Processor 1 core (volts) | 1.3.4.1.4.1.674.10442.1.600... | Integer | No Comparison | >= | | <= |
| Edit Thresholds | Processor 2 core (volts) | 1.3.4.1.4.1.674.10442.1.600... | Integer | No Comparison | >= | | <= |
| Edit Thresholds | Motherboard +5V (volts) | 1.3.4.1.4.1.674.10442.1.600... | Integer | No Comparison | >= | | <= |
| Edit Thresholds | Motherboard +12V (volts) | 1.3.4.1.4.1.674.10442.1.600... | Integer | No Comparison | >= | | <= |
| Edit Thresholds | Motherboard +3.3V (volts) | 1.3.4.1.4.1.674.10442.1.600... | Integer | No Comparison | >= | | <= |
| Edit Thresholds | Motherboard +2.5V (volts) | 1.3.4.1.4.1.674.10442.1.600... | Integer | No Comparison | >= | | <= |

[Add Supplemental OID]

Rows with a "*" in the Description field have unsaved changes.

[Accept Changes] [Reset Changes] [Help]

FIG. 7

Server Details

Details for SNMP target 172.16.0.47

| System/Status | Network Interfaces |

| | |
|---|---|
| SNMP System Object ID: | 1.3.6.1.4.1.1575.1.5 |
| SNMP System Location: | Gambit Communications, Inc., Nashua, NH |
| SNMP System Contact: | Uwe Zimmermann |
| SNMP System Name: | gtisys.gambitcomm.com |
| System Vendor: | Linux |
| System Model: | Linux |
| System Type: | Workstation |
| Uptime: | 13 hours, 21 minutes, 56.20 seconds |
| SNMP Status: | Available - successful contact at last scan |
| Current Alarm State: | No errors detected. |
| Ping Round Trip Time (seconds): | 0.8 |
| Last Error Reason: | NONE |
| Route Trace as of last scan: | 1  1.92.168.2.1  55 ms  47 ms  55 ms |
| | 2  192.168.2.28  8 ms  0 ms  0 ms |
| | 3  172.16.0.47  8 ms  8 ms  70 ms |

FIG. 9

METHOD AND APPARATUS FOR COLLECTING AND DISPLAYING NETWORK DEVICE INFORMATION

RELATED APPLICATIONS

This application claims the benefit under 35 U.S.C. §120 of U.S. application Ser. No. 10/428,874, entitled "METHOD AND APPARATUS FOR COLLECTING AND DISPLAYING NETWORK DEVICE INFORMATION," filed on May 2, 2003, which is herein incorporated by reference in its entirety. U.S. application Ser. No. 10/428,874 claims priority under 35 U.S.C. §119(e) to U.S. Provisional Application Ser. No. 60/377,708, entitled "METHOD AND APPARATUS FOR COLLECTING AND DISPLAYING NETWORK DEVICE INFORMATION," filed on May 3, 2002, which is herein incorporated by reference in its entirety.

TECHNICAL FIELD

This disclosure relates in general to network monitoring systems. More specifically, the disclosure relates to a method and apparatus for collecting and displaying data associated with network devices.

BACKGROUND

The Simple Network Management Protocol (SNMP) has become the standard for network management. Network management systems utilizing SNMP contain two primary elements: a manager and agents. The Manager is the console through which the network administrator performs network management functions. Agents are the entities that interface to the actual device being managed. Hubs, bridges, routers and servers are examples of managed devices that contain managed objects. These managed objects might contain hardware inventory data, configuration parameters, and performance statistics that directly relate to the current operation of the device. These objects are arranged in what is known as a management information base (MIB). Each managed object has an object identifier (OID). SNMP allows managers and agents to communicate for the purpose of accessing these objects.

With the embracing of SNMP by network device vendors, the amount of MIB data contained in an organization's information technology (IT) department has become so large that isolating useful management information requires a fair degree of knowledge, expertise, and time. As a result, much of the SNMP instrumentation developed by device vendors, and the resulting network management capabilities, are not utilized by the typical IT professional.

As such, many typical network management systems suffer from deficiencies in providing easy access to and use of management information. Accordingly, there is a need for an improved method and apparatus for collecting and displaying network device information.

SUMMARY

In one particular embodiment, the disclosure is directed to a network management system. The network monitoring system includes at least one device definition file, a simple network management protocol enabled communications interface, and a data access interface. The device definition file includes query instructions associated with a network device. The simple network management protocol enabled communications interface may access the network device using the query instructions and may receive response data from the network device. The data access interface may be configured to provide external access to the response data.

In another particular embodiment, the disclosure is directed to a network monitoring system. The network monitoring system includes at least one device definition file, a simple network management protocol communications interface, and a data access interface. The device definition file includes query instructions for accessing a management information base supporting a network device. The simple network management protocol communications interface may access the network device using the query instructions and may receive response data from the network device. The data access interface may be configured to send a notification in response to a comparison of a threshold value and the response data.

In an additional embodiment, the disclosure is directed to a device definition file. The device definition file includes query instructions for accessing a management information base using the simple network management protocol, supplemental data associated with the network device, and computer-implement instructions for unit conversion of at least one field of retrieved data associated with the query instructions.

Another embodiment disclosed is an interface. The interface is presented on a display. The interface includes response data from a query to a network device using a simple network management protocol and a device definition file. The user interface also includes supplemental data associated with the network device and stored in the device definition file. The user interface also includes converted data derived from the response data in accordance with the device definition file.

Further exemplary embodiments are directed to a method of generating a device definition file. The method includes the steps of determining an object identification associated with a management information base of a network device; generating query instructions associated with the object identification; adding supplemental data to the query instructions, and providing a unit conversion code to the query instructions. The supplemental data and unit conversion code are associated with the object identification.

Additional exemplary embodiments are directed to a method of producing data associated with a network device. The method includes the steps of accessing the network device using query instructions associated with a device definition file and an associated simple network management protocol interface; receiving response data from the network device; converting the response data in accordance with the device definition file to produce converted data.

BRIEF DESCRIPTION OF THE DRAWINGS

FIGS. 6, 7, 8 and 9 depict exemplary interfaces of a network management system.

The use of the same reference symbols in different drawings indicates similar or identical items.

DETAILED DESCRIPTION

A large number of networkable devices conform to Simple Network Management Protocol (SNMP). Each of these devices has a management information base (MIB) that may contain several thousand entries or object identifications (OID). A few of these OIDs relate to environmental and physical conditions such as temperature, power quality, and fan speed. Some other OIDs may relate to current, voltage, humidity, dew point, audio, and motion. Other OIDs provide descriptions relating to OIDs having numerical values. The present disclosure describes a system and method for accessing, collecting, and storing selected data using SNMP, MIBs, and OIDs.

The disclosure discusses a data preparation system and a network monitoring system. The data preparation system has a set of mechanisms to prepare a data file that isolates and surfaces the pertinent OIDs for a specified network-attached device, optionally adds supplemental data, and performs unit conversions. The network monitoring system displays the results from the data preparation system in a user-interface, in which typical SNMP-based monitoring activities can be performed by the user.

Figure 1:
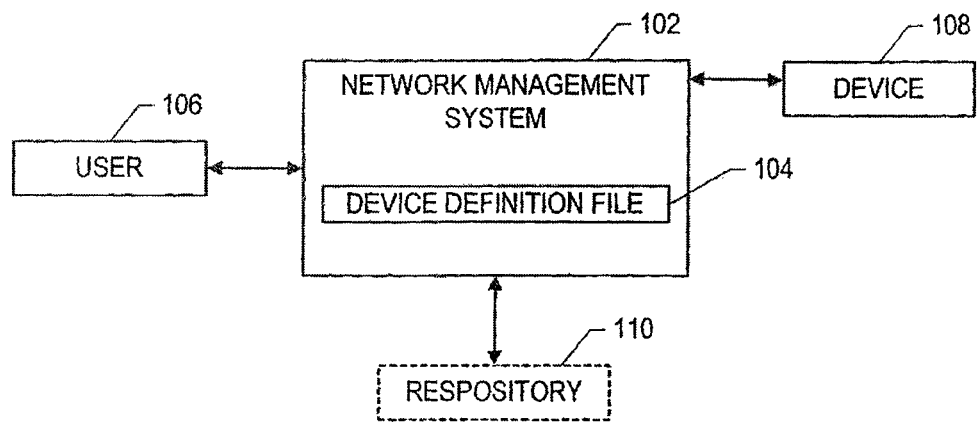
FIGS. 1 and 2 depict exemplary embodiments of network management systems.

FIG. 1 depicts an exemplary embodiment of a network management system. The network management system 102 includes a device definition file (DDF) 104. This device definition file 104 may be considered as part of the data preparation system and may include query instructions, supplemental data, conversion instructions, and other information associated with a network device 108. The network management system 102 may be coupled to the network device 108 through the network and may communicate using network management protocols, such as Simple Network Management Protocol (SNMP), and other communications protocols. For example, the network management system 102 may use the query instructions associated with the device definition file 104 to make an SNMP query to the network device 108. The query may, for example, request physical and environmental data such as temperature, fan speeds, and power quality. In other exampled, the data may include current, voltage, humidity, dew point, audio information, and motion information. The network device 108 may then return response data to the network management system 102. The network management system 102 may augment the response data with supplemental data associated with the device definition file 104 or may perform calculation on the data such as unit conversions in accordance with the device definition file 104. The network management system 102 may also compare the response data with threshold values. In response to this comparison, the network management system 102 may send a notification to the user 106.

The network management system 102 may query the network device 108 periodically or on prompting by a user 106. The network management system 102 may monitor the performance of the network device 108 by periodically querying the network device 108 with the queries associated with the device definition file 104. Alternately, a user 106 may request information or data regarding network device 108. In response to this request, the network management system 102 may access the network device 108 with queries associated with the device definition file 104. In either case, the network device 108 returns response data, which is then augmented with supplemental data and unit conversions associated with the device definition file 104 and provided to the user 106.

The user 106 and network device 108 may be coupled to the network management system 102 through the same or different networks. The device data may be supplied to the user 106 using various transfer protocols and methods including HTTP, FTP, and TCP/IP, among others. For example, the network management system 102 may supply an HTML-based page to the user 106. Alternately, the network management system 102 may provide a data file to the user 106 through FTP transfer. In a further example, the network monitoring system 102 may send a notification of the data through Simple Mail Transfer Protocol (SMTP) or a text messaging protocol.

The network management system 102 may acquire the device definition file 104 from a repository 110. This acquisition may be in response to discovering a device 108 on the network, periodically checking for updates to device definition files, or at the prompting of the user 106.

Exemplary embodiments may be implemented on various forms of equipment. One exemplary embodiment may be implemented on a network appliance. A network appliance may be, for example, a stand-alone device built to perform a well-defined set of functions and that is capable of connecting to a global network such as the Internet. The appliance may include software to configure, monitor, and control its functions via the global network. The appliance may include a processor subsystem. The processor subsystem may have a microprocessor, memory, and associated support circuitry necessary for the microprocessor to function. One exemplary embodiment may use a 32-bit RISC processor manufactured by Motorola. Other embodiments could utilize 16-bit or even 8-bit microprocessors. Other embodiments may include 64 MB Flash memory for program storage, 128 MB of RAM for data storage, and a real time clock (RTC).

The appliance may also include nonvolatile memory for maintaining state information in the event of power loss. The information stored in nonvolatile memory may include: device definition files (DDFs), configuration files, the values of the RTC for the beginning and end of the period that network performance data was measured, the last known state of network devices, and threshold data.

In one exemplary embodiment, the network management system 102 may be a miniaturized environmental monitoring unit with a web-enabled interface. This miniaturized environmental monitoring apparatus may be coupled to an intranet. Using device definition files, the miniaturized environmental monitoring unit may also communicate with devices on the intranet. This communication may be used to monitor environmental sensors on the devices or operational characteristics of the devices. The data acquired from the devices on the intranet may then be provided to a user. The user may be on a wide-area network or global network separate from the intranet. The miniaturized environmental monitoring system may also communicate with a central data repository or centralized management system such as Netbotz Central.

Figure 2:
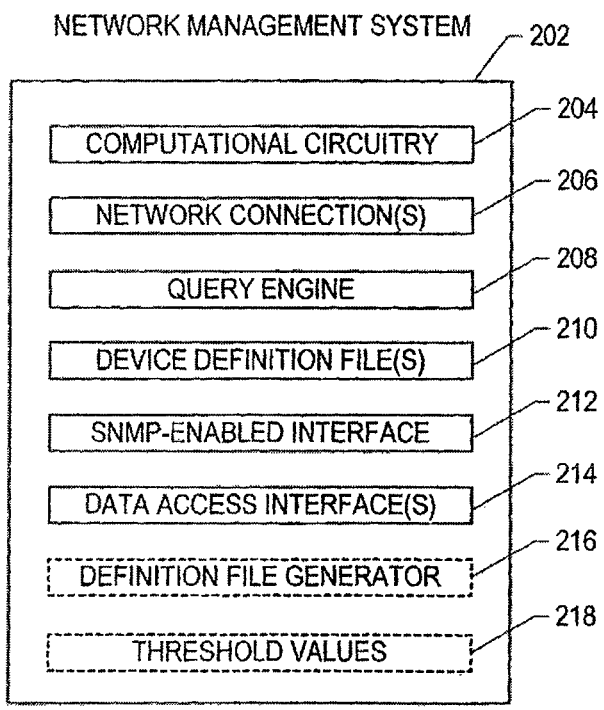

FIG. 2 depicts an exemplary network management system 202. The network management system 202 may include computational circuitry 204, network connection(s) 206, a query engine 208, a device definition file(s) 210, an SNMP-enabled interface 212, and a data access interface 214. The network management system 202 may also include a device definition file generator 216 and threshold values 218.

The computational circuitry 204 may take the form of processors, memory and other communications circuitry for providing a computational platform. The network connections 206 may take various forms including wireless and hard-wired network connections such as Ethernet, wireless Ethernet, Bluetooth®, USB, serial connections, pager networks, telephone networks, other radio frequency connections, and other hard-wired connections. The network connections 206 may permit communication with other networked devices via various protocols including TCP/IP, HTTP, FTP, SNMP, SMTP, SNPP, text messaging protocols, and UDP, among others. The network management system 202 may include more than one network connection 206. For example, the network management system 202 may include a connection to an intranet. In addition, the network management system 202 may include a connection to an external network such as a wide-area network or a global network such as the Internet.

The network management system 202 may include a query engine 208 and device definition files 210 associated with devices to be monitored on a network. The query engine 208 may interpret query instructions associated with the device definition file 210. The device definition files 210 may include query instructions, associated OIDs, associated values and units, and descriptions associated with devices on the network. The device definition file 210 may also include supplemental data and conversion codes associated with the OIDs. A different device definition file 210 may be provided for each device on the network. Alternately, device definition files 210 may be provided for each type of network equipment. Also, the DDFs may be provided for each vendor of networked devices. For example, device definition files 210 may be provided for servers, routers, switches, and other SNMP-enabled networked equipment. The query engine 208 may also query a device on the network using the query instructions of the device definition file 210 to determine which subset of query instructions apply to a particular device.

The network management system 202 may also include an SNMP-enabled interface 212. The SNMP-enabled interface 212 may permit communication between the network management system 202 and devices on the network. Other interfaces may be provided for various network management protocols and the device definition files 210 or query engine 208 altered to communicate using these alternate protocols.

A data access interface 214 may also be provided. Users or central server systems may access this data access interface 214 to acquire response data from queries of network devices. The data access interface 214 may take various forms and communicate using various protocols such as HTTP, SMTP, FTP, and text messaging formats. For example, the data access interface 214 may provide an HTML, XML, or plain text file containing requested data associated with the device definition file 210 and devices on the network. Alternately, the data access interface 214 may provide for the FTP access of data files. In another embodiment, the data access interface 214 may provide for SMTP access to data. The network management system 202 may e-mail notifications and data to users. In a further embodiment, the network management system 202 may have access to pager networks or telephone networks and transmit data in associated formats. In this manner, physical and environmental data associated with a device, for example, may be supplied to a user.

The network management system 202 may also include a device definition file generator 216. The definition file generator 216 may generate device definition files from data acquired from devices on the network. The generation of the device definition file may be performed upon discovery of the device or at the direction of a user. The definition file generator 216 may acquire a device definition file from a repository or may generate a device definition file using MIB information associated with the device. In either case, the user may supplement data associated with the device object identifications and MIB. In addition the user may provide for unit conversions.

The network monitoring system 202 may also include threshold values 218. These threshold values 218 may be set by a user and compared with values acquired through queries to network devices. Threshold values 218 may also be acquired from manufacturer suggested values stored in the MIB. If a value or the response data violates or transgresses a threshold value, the network monitoring system 202 may establish an alarm or notify a user. For example, the network monitoring system 202 may email a notification to a user, page a user, or send a text message to a user's portable phone or PDA.

One exemplary embodiment may use a network appliance as the hosting platform. The network monitoring system may be software that includes the components necessary to monitor network devices via SNMP, and the components necessary to interface with the DDFs. The network monitoring subsystem may download the vendor-specific DDFs from a DDF repository located on a server on the Internet, or from the local console if the user does not have an Internet connection. It may have the capability to periodically check the repository for new and updated DDFs. The system may then use the DDF information derived from or along with the corresponding MIBs to display the monitoring information to the user. Other embodiments of the network monitoring system may display network management information that allows the user to directly manage, as well as monitor, their network devices.

A further exemplary embodiment may allow the setting of thresholds on the derived OID values so that the user can be alerted to abnormal or unwanted network device conditions via the network appliance. The format and style of the thresholds are dependent on the data type in question, and may be dependent on a series of data types in order to completely determine the threshold conditions. Other network performance data is also monitored, such as network roundtrip time. Future versions of the DDFs could contain vendor recommended threshold information.

This exemplary embodiment may allow for surfacing the current values and alert states to other network monitoring solutions, both SNMP based and non-SNMP based. SNMP traps can be generated for alert conditions, and both alarm notifications and periodic status may be reported via HTTP (both POST and GET methods), FTP (STOR method), email, and alphanumeric paging. Other embodiments of the network monitoring systems may utilize other standard network protocols available at the time. The exemplary embodiment may include provisions for the delivery of alert notifications and periodic status reports, using the previously listed methods, across both an Ethernet-based TCP/IP network, as well as using alarm-initiated modem dial out (based on PPP). Additional delivery media, including 802.11a/b/g, cellular, RS-232, and Bluetooth®, are among the additional embodiments considered.

Figure 3:
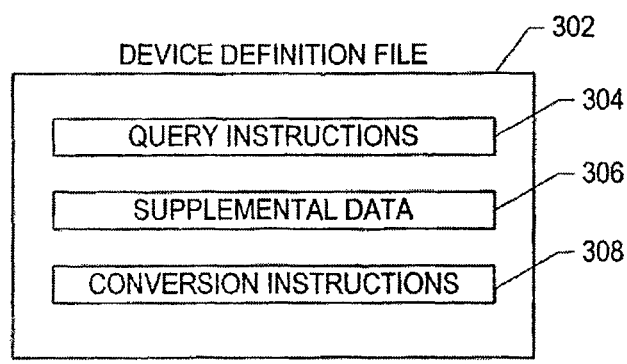
FIG. 3 depicts an exemplary embodiment of a device definition file.

FIG. 3 depicts an exemplary device definition file 302. The device definition file 302 includes query instructions 304, supplemental data 306, and conversion instructions 308. The query instructions 304 may be interpreted to make queries to an MIB associated with a device. A network management system may use these queries and communicate with a device using a management protocol to collect values associated with object identifiers (OIDs). For example, the network management system may query physical or environmental parameters such as temperatures, fan speeds and power quality parameters. In other examples, the parameters may relate to humidity, voltage, current, dew point, audio information, and motion.

The supplemental data 306 and the conversion instructions 308 may be used to augment the results of the queries. In one exemplary embodiment, the supplemental data 306 and the conversion instructions 308 may be integrated into the query instructions 304. The supplemental data 306 may include descriptions, descriptive names, and preset values. The conversion instructions 308 may permit the unit conversion of data acquired through the queries 304. Unit conversions may be performed on management data so that the network monitoring application displays the units as expected by the end-user. The conversion instructions 308 may also permit replacement of values and character strings, and conversion from integer values to floating point values.

The query instruction may take the form of one of three query types, among others: static (single item surfaced from an OID), table (enumerated items surfaced from an OID), and noQuery (supplemental data provided by the device definition file author). The static query type may be used to obtain data from any or all of the set of MIBs that may be implemented by a particular SNMP agent. If the MIB defines a data type for the raw value of the object being obtained then the network monitoring system may dynamically obtain that value. Alternately, the raw value data type may be statically defined on that line by the author of the device definition file, or by definition file generation software. The raw value of the object may take on several different types including integers, and strings, among others. An enumerated type may also be allowed where an integer returned by the agent can correspond to either a string or number defined in the enumeration portion of the query line. This query type may have the ability to perform calculations on the returned value.

The scale and precision may also be queryable from a static line entry for objects with numeric data types, if this information is so contained in the MIB. If this information is not in the MIB, again, the device definition file author, or definition file generation software, may designate a value for scale and precision of the object.

Descriptive information may be queried from the agent when it is available. The descriptive information may take on any data type such as integer or string, as well as an enumerated data type. Additional descriptive identification strings can be prepended and/or appended to the description of the object contained in the MIB, if any.

In one exemplary embodiment, the static query type may be formatted as follows: static : sensorDataType : sensorDataTypeOid : rawValueDataType : rawValueOid : rawValueScaleDataType : rawValueScaleOid : rawValuePrecisionDataType : rawValuePrecisionOid : descriptionDataType : descriptionOid : prependDescriptionText : appendDescriptionText :
where:
  <sensorDataType> is the type of value or data contained in the <rawValueOid>, including 'DisplayString', 'Integer', 'am' (Amperes), 'dc' (Degrees Celsius), 'df' (Degrees Fahrenheit), 'fm' (Feet/Minute), 'ho' (Hours), 'hz', (Hertz), 'mi' (Minutes), 'mm', Meters/Minute), 'ot' (Other), 'pe' (Percent), 'rh' (Percent Relative Humidity), 'rp' (Revolutions per Minute, or RPMs), 'se' (Seconds), 'sp' (Special Enumerated Type), 't1', (time in HH:MM:SS:MS format), 't2' (time in HH:MM:SS format), 't3' (time in HH:MM format), 'ti' (Time Ticks), 'un' (Unknown), 'va' (Volts AC), 'vd' (Volts DC), 'vo' (Volts), 'wa' (Watts), among others. Additional types can be defined using the #define statement.
  <sensorDataTypeOID> is an optional OID specifying the type of data contained in the raw value OID; only used where this type of data is enumerated.
  <rawValueDataType> is either blank or enum{x,xs, y,ys, z,zs} where x,xs, y,ys, z,zs are value-string pairs used to determine the actual value where the value from the rawValueDataType represents a finite number of enumerated values.
  <rawValueOid> the OID containing the unprocessed data.
  <rawValueScaleDataType> specifies the scale or magnitude of the raw data. It is either a power of 10, or an enum{ } string representing a power of 10, as specified above. In the enum{ } case, the value used to choose the scale is obtained from the following field OID.
  <rawValueScaleOid> specifies the OID used to determine the scale when that scale is an enumerated value from within the MIB.
  <rawValuePrecisionDataType> specifies the precision (display precision) to be used for the data type. It can also be an enum{ } string, in which case the following field is used to choose the precision.
  <rawValuePrecisionOid> specifies the OID used to determine the precision when that precision is an enumerated value from within the MIB.
  <descriptionDataType> specifies the description, as an enum{ } field, when the enum selection will be determined by the following OID.
  <descriptionOid> specifies the description of the data. It can either be a STRING value or an integer used to enumerate through the above descriptionDataType.
  <prependDescriptionText> specifies a string to be prepended to the resulting string (if any) from the combination of the descriptionOid and the descriptionDataType.
  <appendDescriptionText> specifies a string to be appended to the resulting string (if any) from the combination of the descriptionOid and the descriptionDataType.
Examples of the static query type include:
static:dc:::1.3.6.1.4.1.5528.32.10.2:1::::::Temperature::
static:::DisplayString:
    1.3.6.1.4.1.674.10892.1.300.10.1.9.1::::::::Model::

Table query types may expand on the static queries by allowing the network system to apply a whole list of static queries to an index based table. Tabular MIB data is typically found in vendors' MIBS. The table query may be supplied with an object that when queried, the agent will return a list of numeric indices. These indices may then be appended to the original object and iterated through and applied to each following static entry in the table until a new entry is found in the device definition file, starting a new separate query. The static queries may take on the same form as described above in the static query type paragraph. Table queries may contain other tabular MIB objects in any of their fields. In this manner it is possible to pair object types, raw values, scales, precisions, and descriptions with data contained in separate individual tables in the MIB, by matching the index in the individual tables with the list of indices returned by the agent when the index object was queried.

In one exemplary embodiment, the table query type may be formatted as follows: table : indexOid : sensorDataType : sensorDataTypeOid : rawValueDataType : rawValueOid : rawValueScaleDataType : rawValueScaleOid : rawValuePrecisionDataType : rawValuePrecisionOid : descriptionDataType : descriptionOid : prependDescriptionText : appendDescriptionText :
where:
  <indexOid> is the base SNMP OID of the index column for the table. Each value found in this column is enumerated through and used as an index for the other OID fields within the table line (and its continuation lines).
  <sensorDataType> is the type of value or data contained in the <rawValueOid>, including 'DisplayString', 'Integer', 'am' (Amperes), 'dc' (Degrees Celsius), 'df' (Degrees Fahrenheit), 'fm' (Feet/Minute), 'ho' (Hours), 'hz', (Hertz), 'mi' (Minutes), 'mm', Meters/Minute), 'ot' (Other), 'pe' (Percent), 'rh' (Percent Relative Humidity), 'rp' (Revolutions per Minute, or RPMs), 'se'

(Seconds), 'sp' (Special Enumerated Type), 't1', (time in HH:MM:SS:MS format), 't2' (time in HH:MM:SS format), 't3' (time in HH:MM format), 'ti' (Time Ticks), 'un' (Unknown), 'va' (Volts AC), 'vd' (Volts DC), 'vo' (Volts), 'wa' (Watts), among others. Additional types can be defined using the #define statement.

<sensorDataTypeOID> is an optional OID specifying the type of data contained in the raw value OID; only used where this type of data is enumerated.

<rawValueDataType> is either blank or enum{x,xs, y,ys, z,zs} where x,xs, y,ys, z,zs are value-string pairs used to determine the actual value where the value from the rawValueDataType represents a finite number of enumerated values.

<rawValueOid> the OLD containing the unprocessed data.

<rawValueScaleDataType> specifies the scale or magnitude of the raw data. It is either a power of 10, or an enum{ } string representing a power of 10, as specified above. In the enum{ } case, the value used to choose the scale is obtained from the following field OID.

<rawValueScaleOid> specifies the OID used to determine the scale when that scale is an enumerated value from within the MIB.

<rawValuePrecisionDataType> specifies the precision (display precision) to be used for the data type. It can also be an enum{ } string, in which case the following field is used to choose the precision.

<rawValuePrecisionOid> specifies the OID used to determine the precision when that precision is an enumerated value from within the MIB.

<descriptionDataType> specifies the description, as an enum{ } field, when the enum selection will be determined by the following OID.

<descriptionOid> specifies the description of the data. It can either be a STRING value or an integer used to enumerate through the above descriptionDataType.

<prependDescriptionText> specifies a string to be prepended to the resulting string (if any) from the combination of the descriptionOid and the descriptionDataType.

<appendDescriptionText> specifies a string to be appended to the resulting string (if any) from the combination of the descriptionOid and the descriptionDataType.

Each table line may have continuation lines which have the format: : sensorDataType : sensorDataTypeOid : rawValueDataType : rawValueOid : rawValueScaleDataType : rawValueScaleOid : rawValuePrecisionDataType : rawValuePrecisionOid : descriptionDataType : descriptionOid : prependDescriptionText
: appendDescriptionText :
and where the fields have the same meanings as the primary table line.

Examples of the table query type include:
table:1.3.6.1.4.1.674.10892.1.700.20.1.2:dc:::
1.3.6.1.4.1.674.10892.1.700.20.1.10:1:::::
1.3.6.1.4.1.674.10892.1.700.20.1.8::Upper Threshold:
:dc:::1.3.6.1.4.1.674.10892.1.700.20.1.6:1:::::
1.3.6.1.4.1.674.10892.1.700.2 0.1.8:::
:dc:::1.3.6.1.4.1.674.10892.1.700.20.1.13:1:::::
1.3.6.1.4.1.674.10892.1.700. 20.1.8::Lower Threshold:
table:1.3.6.1.4.1.9.9.91.1.1.1.1.1:enum{1,ot,2,un,3,va,4, vd,5,am,6,wa,7,hz, 8,dc,9,rh,10,rp,11,cm,12,tv,13,sp}:
1.3.6.1.4.1.9.9.91.1.1.1.1.1::1.3.6.1.4.1.
9.9.91.1.1.1.1.4:enum{1,-24,2,-21,3,-18,4,-15,5,-12, 6,-9,7,-6,8,-3,9,0,10,3,11,6,12,9,13,12,14,18,15, 15,16,21,17,24}:1.3.6.1.4.1.9.9.91.1.1.
1.1.2::1.3.6.1.4.1.9.9.91.1.1.1.1.3::1.3.6.1.2.1.47.
1.1.1.1.2:::

The noQuery type may be used to publish additional data to the user interface that is desirable to be shown with the data being monitored, but the vendor failed to include in any MIB file implemented by the agent. The noQuery line may have the ability to specify the data type of the raw value to be displayed. The raw value may be in this case, of course, statically defined in the device definition file itself. In order for this data to qualify for being displayed with the other data being monitored from a specific agent, the noQuery type may specify an object in the agent's MIB. In one exemplary embodiment, the data will not be displayed if the agent does not return a value. This validates that the agent is one that the network system software knows this data should be displayed for, as long as a token object exists in its MIB. A description of the data being displayed may be specified as well in the device definition file.

The noQuery type may be formatted as follows:
noQuery:<rawValueDataType>:<rawValue>:<requiredOid>:<optionalDescriptionText> where:

<rawValueDataType> is the type of data to be displayed, including 'DisplayString', 'Integer', 'am' (Amperes), 'dc' (Degrees Celsius), 'df' (Degrees Fahrenheit), 'fm' (Feet/Minute), 'ho' (Hours), 'hz', (Hertz), 'mi' (Minutes), 'mm', Meters/Minute), 'ot' (Other), 'pe' (Percent), 'rh' (Percent Relative Humidity), 'rp' (Revolutions per Minute, or RPMs), 'se' (Seconds), 'sp' (Special Enumerated Type), 't1', (time in HH:MM:SS:MS format), 't2' (time in HH:MM:SS format), 't3' (time in HH:MM format), 'ti.' (Time Ticks), 'un' (Unknown), 'va' (Volts AC), 'vd' (Volts DC), 'vo' (Volts), 'wa' (Watts). Additional types can be defined using the #define statement.

<rawValue> is the value of the attribute

Figure 4:
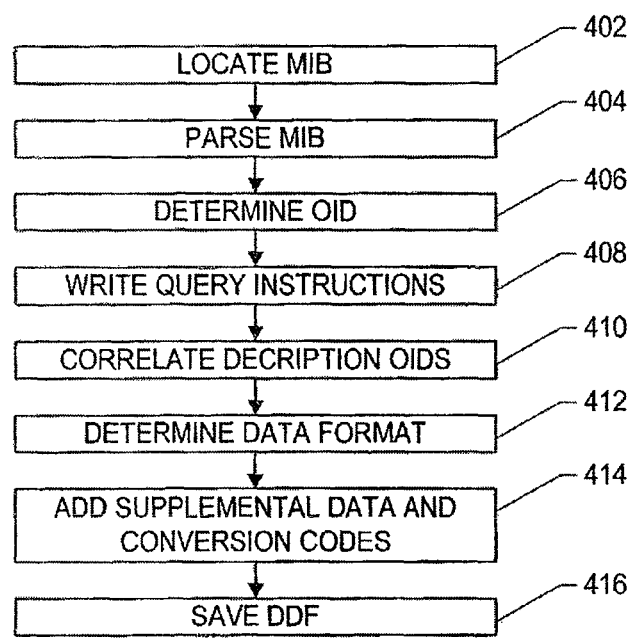
FIGS. 4 and 5 depict exemplary methods for use by a network management system.

<requiredOid> is the SNMP OID of an object that exist on the device in order for the attribute to be relevant <optionalDescriptionText> is a user-friendly label for the attribute Examples of the noQuery type include:
noQuery:DisplayString:NetBotz:
1.3.6.1.4.1.5528.30.10.1:Vendor
noQuery:DisplayString:Compaq:1.3.6.1.4.1.232.2.2.4.2:
Vendor:

FIG. 4 depicts a method for generating a device definition file (DDF). At step 402, the MIB is located for a device. This MIB may be provided by the vendor or acquired from the device. The MIB may then be parsed, as shown in step 404. The parsing may use a keyword search within the MIB to produce the initial DDF, which may then be modified by the DDF author with management information that is not derived programmatically. The keywords may be used to determine or surface the OIDs of interest, as shown in step 406. These OIDs may include different types of management data, such as environmental, performance, or inventory data.

Using the OIDs, query instructions may be written, as shown at step 408. If available, these query instructions may be correlated with other OIDs indicating description data, as shown at step 410. The query instructions may be static, table, or noQuery type instructions. The static query instructions may include a reference to the OID and a reference to the correlated description OID. A table query instruction may include a reference to a wildcard or MIB branch starting point. The table query may also include a reference to a correlated description OID starting point.

The data format of the values returned through queries associated with the query instructions may be determined, as shown at step 412. This data format may include characters, integers, and other formats. The data may be supplemented and converted. Integer values may be converted to floating point values. Integers may be replaced with descriptive strings and non-query data may be supplied as descriptions. The supplemental data and conversion codes may be added to the query instructions, as shown in step 414. A set of query instructions including OIDs, supplemental data, and conversion codes may then be saved as a device definition file, as shown in step 416.

The device definition file may be made manually or automatically. Other embodiments could utilize a graphical user-interface that builds the device definition file interactively, depending on the type of network management the user was interested in, or employ the internet to search known MIB repositories from specific network device vendors. Additional query types can be added to handle changes or additions to the MIB structure as needed.

Figure 5:
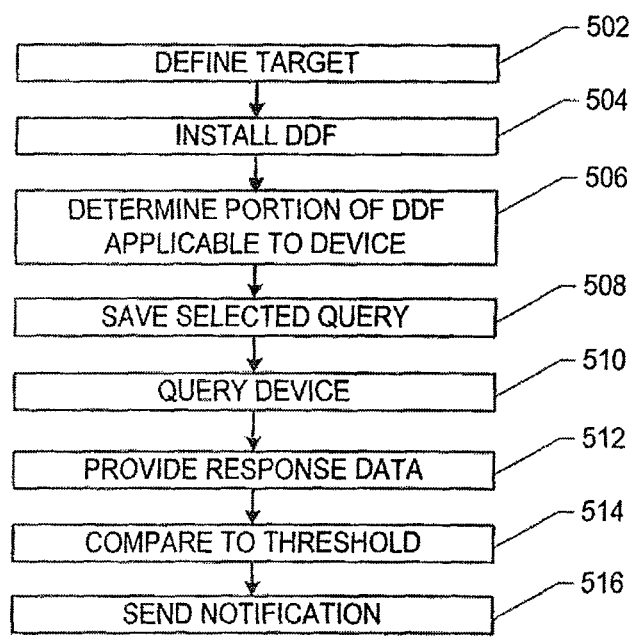

FIG. 5 depicts a method for providing access to data associated with a network device using a device definition file. A target device may be defined, as shown in step 502. An interface may be provided to a user to provide the address and other information associated with the device. A device definition file associated with the device may also be installed, as shown in step 504. Also, multiple device definition files may be installed. Multiple device definitions files may apply to a single device. Device definition files may be structured so that they are generic or cover a class of devices or similar devices from a specific vendor. Therefore a device definition file associated with the device may be installed prior to the definition of the target device.

In step 506, an initial query is made to the device to determine what portion of the device definition file(s) applies to the device. The device definition file may be written in a device specific form. In which case, the whole device definition file may be applicable. However, if the device definition file is written to cover a class of devices or devices with similar MIBs, a subset of the query instructions may apply or a wildcard reference to a branch in the MIB tree may return a different set of OIDs. The results of the initial queries may be stored as selected queries associated with the device, as shown in step 508.

Periodically or on-demand, the network monitoring system may query the device, as shown in step 510. The device may provide response data to the network monitoring system. The network monitoring system may interpret these results and provide the response data or interpreted response data to a user or user interface, as shown in step 512. The network monitoring system may convert units and numerical types, replace integers with corresponding entries in an enumerated list, replace descriptive names, and perform other functions in accordance with the device definition file to provide the interpreted response data to the user.

The response data may also be compared to threshold values, as shown in step 514. If the response data transgresses threshold values or violates rules associated with the threshold values, a notification may be sent to a user, as shown in step 516. This notification may be an email, page, text message, or other communications. Alternately, the notification may be a visual change or audio alarm encoded in an HTML page.

Using the descriptions provided by the DDF, an exemplary embodiment may provide an easy to use and friendly presentation of the desired SNMP data provided by the device. Unlike typical SNMP tools, the labels presented may be easy to read and have plain meaning, as opposed to the symbolic names dictated by the MIB syntax standard. In an exemplary embodiment, the user is presented with only relevant desired SNMP data, as opposed to all objects in a MIB. An example panel, derived from a DDF, is shown in FIG. 6.

In this example, several of the aspects of the interface are evident. The description labels are clear and descriptive, as opposed to being cryptic and symbolic. The values of many of the fields are floating point (a format not supported by SNMP natively). In the example shown in FIG. 6, the DDF provides a scaling factor to convert the raw data (which was an integer number of millivolts) to the more familiar unit (volts). By using the table query, coupled with the description OIDs, a number of different attributes (the various voltages instrumented by the vendor MIB) are presented in a clear and easy to identify manner, without requiring explicit definitions for each attribute.

Figure 8:
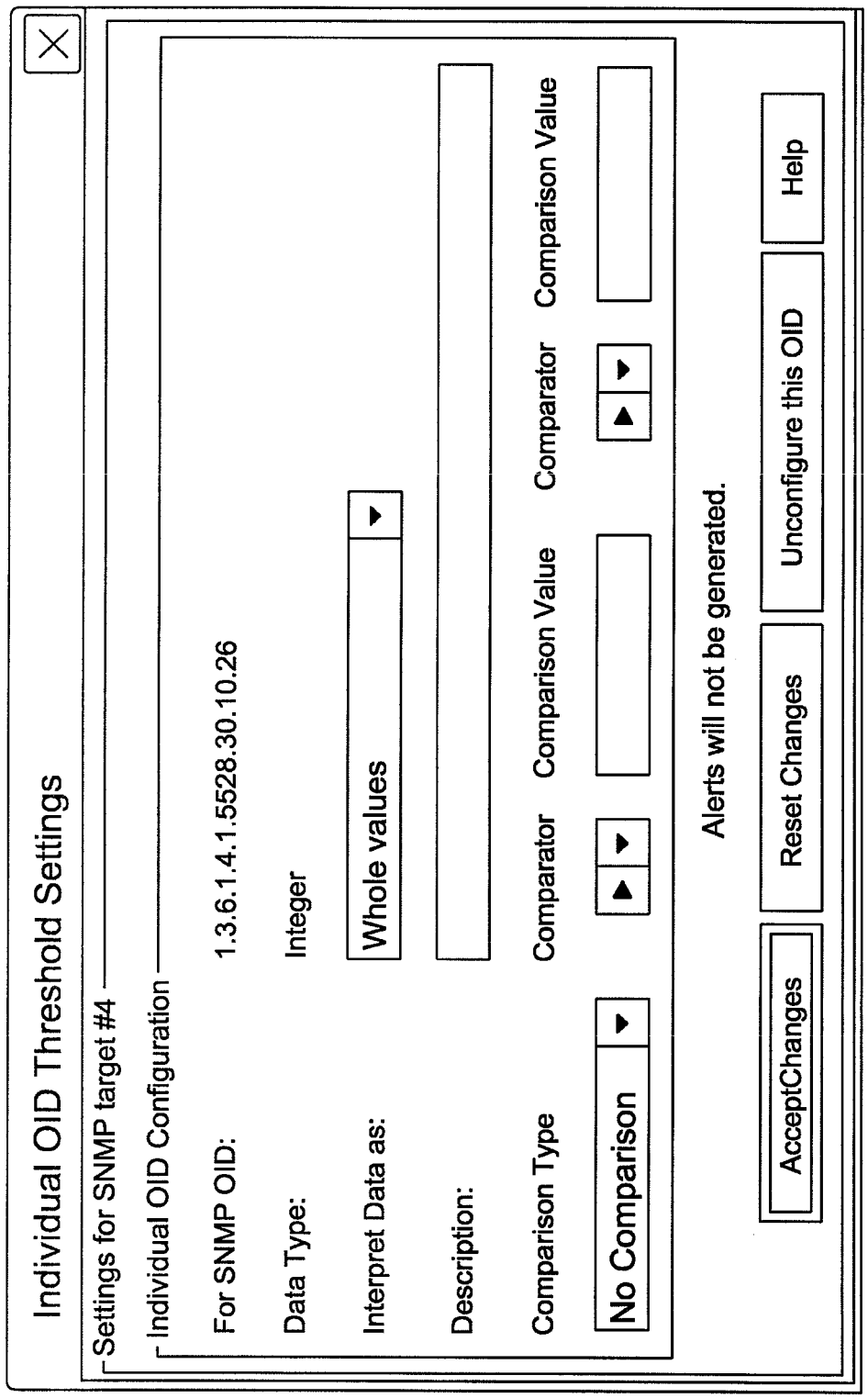

The Network Monitor may also provide an interface for the definition of thresholds, as shown in FIG. 7 and FIG. 8. This interface may provide support for a variety of logical comparison operations (greater-than, less-than, not-equal, etc), allowing a high degree of control over threshold definitions.

The user may also enter in custom OIDs, allowing support of additional, device-specific or application-specific instrumentation. As shown in FIG. 8, the user is enabled to enter in a description of the field, as well as being allowed to select between a variety of interpretations of the data (including scaling of the values).

The network monitoring system may also collect a variety of generic or device independent information, including various MIB-2 SNMP data and trace route information. The trace route information describes the routing of packets between the network monitoring system and the device being monitored. This information may be summarized, and presented for user viewing as shown in FIG. 9. This information may also be monitored, and alert notifications generated, when abnormal results are obtained. The routing information may also be included in any alarm notifications, which can prove invaluable when attempting to determine the source of a network outage since loss of contact with a device may mean the device has failed or the network between the network monitoring system and the device has failed.

Example device definition files are provided. The following device definition file is an example of a 3rd party equipment device definition file.

NBOCFV3F1.0 Example Corporation
static:::DisplayString:
1.3.6.1.4.1.674.10892.1.300.10.1.8.1::::::::Vendor::
static:::DisplayString:
1.3.6.1.4.1.674.10892.1.300.10.1.9.1::::::::Model::
    table:1.3.6.1.4.1.674.10892.1.600.12.1.2:::enum{1,Other, 2,Unknown,3,OK,4, Non-critical,5,Critical,6,Nonrecoverable}:1.3.6.1.4.1.674.10892.1.600.12.1.5:::::::
1.3.6.1.4.1.674.10892.1.600.12.1.8:::
    :::enum{1, Other,2,Unknown,3,Full4,Degraded,5,Lost,6, Not Redundant,7, Redundancy Offline}:
1.3.6.1.4.1.674.10892.1.600.10.1.5::::::1.3.6.1.4.1.674. 10892.1. 600.10.1.7:::
    table:1.3.6.1.4.1.674.10892.1.700.20.1.2:dc:::
1.3.6.1.4.1.674.10892.1.700.20.1.10:1:::::
1.3.6.1.4.1.674.10892.1.700.20.1.8::Upper Threshold:
    :dc:::1.3.6.1.4.1.674.10892.1.700.20.1.6:1:::::
1.3.6.1.4.1.674.10892.1.700.20.1.8:::
    :dc:::1.3.6.1.4.1.674.10892.1.700.20.1.13:1:::::
1.3.6.1.4.1.674.10892.1.700.20.1.8: :Lower Threshold:
    table:1.3.6.1.4.1.674.10892.1.700.12.1.2:rp:::

1.3.6.1.4.1.674.10892.1.700.12.1.10: :::::
1.3.6.1.4.1.674.10892.1.700.12.1.8::Upper Threshold:
 :rp:::1.3.6.1.4.1.674.10892.1.700.12.1.6::::::
1.3.6.1.4.1.674.10892.1.700.12.1.8:::
 :rp:::1.3.6.1.4.1.674.10892.1.700.12.1.13::::::
1.3.6.1.4.1.674.10892.1.700.12.1.8:: Lower Threshold:
 table:1.3.6.1.4.1.674.10892.1.600.20.1.2:vo:::
1.3.6.1.4.1.674.10892.1.600.20.1.10:3:::::
1.3.6.1.4.1.674.10892.1.600.20.1.8::Upper Threshold:
 :vo:::1.3.6.1.4.1.674.10892.1.600.20.1.6:3:::::
1.3.6.1.4.1.674.10892.1.600.20.1.8:::
 :vo:::1.3.6.1.4.1.674.10892.1.600.20.1.13:3:::::
1.3.6.1.4.1.674.10892.1.600.20.1.8::Lower Threshold:
 table:1.3.6.1.4.1.674.10892.1.600.30.1.2:am:::
1.3.6.1.4.1.674.10892.1.600.30.1.10:3:::::
1.3.6.1.4.1.674.10892.1.600.30.1.8::Upper Threshold:
 :am:::1.3.6.1.4.1.674.10892.1.600.30.1.6:3:::::
1.3.6.1.4.1.674.10892.1.600.30.1.8:::
 :am:::1.3.6.1.4.1.674.10892.1.600.30.1.13:3::::::
1.3.6.1.4.1.674.10892.1.600.30.1.8::Lower Threshold:

The following is an example of a network appliance device definition file.

NBOCFV3F1.0 Company
 noQuery:DisplayString:Company:
 1.3.6.1.4.1.5528.30.10.1:Vendor:
 static:::DisplayString:1.3.6.1.4.1.5528.32.10.1::::::::
Model::
 static:dc:::1.3.6.1.4.1.5528.32.10.2:1:::::::Temperature::
 static:rh:::1.3.6.1.4.1.5528.32.10.3::::::::Humidity::
 static:mm:::1.3.6.1.4.1.5528.32.10.4::::::::Airflow::
 static:::enum {0,No,1,Yes}:1.3.6.1.4.1.5528.32.10.5::::::::
Audio Alarm::
 static:::enum{1,Open,0,Closed}:
1.3.6.1.4.1.5528.32.10.6::::::::Door Switch::
 static:dc:::1.3.6.1.4.1.5528.32.10.7:1:::::::Temperature Lower Threshold::
 static:dc:::1.3.6.1.4.1.5528.32.10.8:1:::::::Temperature Upper Threshold::
 static:rh:::1.3.6.1.4.1.5528.32.10.9:::::::::Humidity Lower Threshold::
 static:rh:::1.3.6.1.4.1.5528.32.10.10::::::::Humidity Upper Threshold::
 static:::Integer1.3.6.1.4.1.5528.32.10.11:::::::::Airflow Minutes Off Before Alarm::
 static:::Integer:1.3.6.1.4.1.5528.32.10.12:::::::::Seconds of Audio Before Alarm::
 static:::enum{0,Alarm on Closed,1,Alarm on Open}: 1.3.6.1.4.1.5528.32.10.13::::::::Door Switch Alarm Setting::
 static:::Integer:1.3.6.1.4.1.5528.32.10.14:::::::::Audio Sensor Sensitivity:
 static:mm:::1.3.6.1.4.1.5528.32.10.15::::::::Airflow Lower Threshold::
 static:::enum{0,No Motion,1,Motion Detected,−1,Not Licensed}:1.3.6.1.4.1.5528.32.10.16::::::::Camera Motion::
 static:::Integer:1.3.6.1.4.1.5528.32.10.17:::::::::Camera Motion Sensitivity (1-max, 15-min, 0-disabled)::

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A network monitoring system for monitoring a remote network device, the network monitoring system comprising:
 at least one management information base (MIB) file;
 at least one device definition file separate and distinct from the at least one MIB file, the at least one device definition file including simple network management protocol (SNMP) query instructions based upon information included within the at least one MIB file, the information being descriptive of the remote network device, the SNMP query instructions including at least one instruction for accessing supplemental data in the at least one device definition file, the supplemental data including at least one description for display in a user interface and at least one value for interpreting data received from the remote network device, the at least one description and the at least one value being associated with at least one object identification within the information; and
 a processor subsystem configured to implement:
  an SNMP enabled communications interface to:
   access the remote network device using the SNMP query instructions;
   receive response data associated with the SNMP query instructions from the remote network device, the response data including a symbolic name of environmental data included in the response data, the environmental data including a value representative of an environmental parameter, the symbolic name being in accord with a MIB syntax standard;
   replace the symbolic name in the response data with the at least one description from the supplemental data in the at least one device definition file; and
   interpret the value representative of the environmental parameter using the at least one value for interpreting data; and
  a data access interface configured to provide external access to the response data.

2. The network monitoring system according to claim 1, wherein the data access interface includes a user interface.

3. The network monitoring system according to claim 2, wherein the user interface includes a portable phone.

4. The network monitoring system according to claim 1, wherein the data access interface is further configured to provide trace route information associated with the remote network device.

5. The network monitoring system according to claim 1, wherein the data access interface is further configured to provide MIB-2 SNMP data associated with the remote network device.

6. The network monitoring system according to claim 1, further comprising a central data repository, wherein the data access interface is further configured to provide the response data to the central data repository.

7. The network monitoring system according to claim 1, further comprising a remote device definition file repository, wherein the network monitoring system is configured to download the at least one device definition file from the remote device definition file repository.

8. A method of monitoring a remote network device comprising:
 accessing, by a computer, the remote network device using simple network management protocol (SNMP) query instructions included in a device definition file separate and distinct from at least one management information base (MIB) file, the SNMP query instructions being based upon information included within the at least one MIB file, the information being descriptive of the remote network device, the SNMP query instructions including at least one instruction for accessing supplemental data in the at least one device definition file, the supplemental data including at least one description for display in a user interface and at least one value for interpreting data received from the remote network device, the at least one description and the at least one value being associated with at least one object identification within the information;

receiving response data associated with the SNMP query instructions from the remote network device, the response data including a symbolic name of environmental data included in the response data, the environmental data including a value representative of an environmental parameter, the symbolic name being in accord with a MIB syntax standard;

replacing the symbolic name with the at least one description from the supplemental data in at least one device definition file;

interpreting the value representative of the environmental parameter using the at least one value for interpreting data; and providing external access to the response data in combination with the at least one description.

9. The method according to claim 8, wherein providing external access includes providing external access to the response data via a user interface.

10. The method according to claim 8, wherein providing external access includes providing external access to the response data via a portable phone.

11. The method according to claim 8, wherein providing external access includes providing external access to trace route information associated with the remote network device.

12. The method according to claim 8, wherein providing external access includes providing external access to MIB-2 SNMP data associated with the remote network device.

13. The method according to claim 8, wherein providing external access includes providing the response data to a central data repository.

14. The method according to claim 8, further comprising downloading the device definition file from a remote device definition file repository.

15. A non-transitory computer readable medium having stored thereon sequences of instruction for monitoring a remote network device including instructions that will cause at least one processor to:

access the remote network device using simple network management protocol (SNMP) query instructions included in a device definition file separate and distinct from the at least one management information base (MIB) file, the SNMP query instructions being based upon information within the at least one MIB file, the information being descriptive of the remote network device, the SNMP query instructions including at least one instruction for accessing supplemental data in the at least one device definition file, the supplemental data including at least one description for display in a user interface and at least one value for interpreting data received from the remote network device, the at least one description and the at least one value being associated with at least one object identification within the information;

receive response data associated with the SNMP query instructions from the remote network device, the response data including a symbolic name of environmental data included in the response data, the environmental data including a value representative of an environmental parameter, the symbolic name being in accord with a MIB syntax standard;

replace the symbolic name with the at least one description from the supplemental data in the at least one device definition file;

interpret the value representative of the environmental parameter using the at least one value for interpreting data; and provide external access to the response data in combination with the at least one description.

16. The non-transitory computer readable medium according to claim 15, wherein the sequences of instruction include instructions that will cause the at least one processor to provide external access to the response data via a user interface.

17. The non-transitory computer readable medium according to claim 15, wherein the sequences of instruction include instructions that will cause the at least one processor to provide external access to the response data via a portable phone.

18. The non-transitory computer readable medium according to claim 15, wherein the sequences of instruction include instructions that will cause the at least one processor to provide external access to trace route information associated with the remote network device.

19. The non-transitory computer readable medium according to claim 15, wherein the sequences of instruction include instructions that will cause the at least one processor to provide external access to MIB-2 SNMP data associated with the remote network device.

20. The non-transitory computer readable medium according to claim 15, wherein the sequences of instruction include instructions that will cause the at least one processor to provide the response data to a central data repository.

* * * * *